United States Patent [19]

Motegi

[11] Patent Number: 5,304,991
[45] Date of Patent: Apr. 19, 1994

[54] SELECTIVE CALL RADIO PAGING RECEIVER HAVING DISPLAY FUNCTION AND REDUCED CONTROL INPUTS

[75] Inventor: Takamasa Motegi, Yokohama, Japan

[73] Assignee: Matsushita Electric Industrial Co., Ltd., Osaka, Japan

[21] Appl. No.: 890,378

[22] Filed: May 26, 1992

Related U.S. Application Data

[63] Continuation of Ser. No. 596,368, Oct. 12, 1990, abandoned.

[30] Foreign Application Priority Data

Oct. 18, 1989 [JP] Japan .................................. 1-270633

[51] Int. Cl.$^5$ .............................................. H04Q 1/00
[52] U.S. Cl. ............................ 340/825.44; 340/825.35; 341/20
[58] Field of Search ...................... 340/825.44, 825.49, 340/825.69, 825.56; 341/20

[56] References Cited

U.S. PATENT DOCUMENTS

| | | | |
|---|---|---|---|
| 4,145,684 | 3/1979 | Stodolski | 340/825.48 |
| 4,477,807 | 10/1984 | Nakajima et al. | 340/825.44 |
| 4,663,626 | 5/1987 | Smith | 340/825.69 |
| 4,796,024 | 1/1989 | Sakoh et al. | 340/825.44 |
| 4,804,955 | 2/1989 | Yoshizawa | 340/825.44 |
| 5,012,219 | 4/1991 | Henry | 340/825.44 |

FOREIGN PATENT DOCUMENTS

60-230726 11/1985 Japan .

*Primary Examiner*—Donald J. Yusko
*Assistant Examiner*—Brian Zimmerman
*Attorney, Agent, or Firm*—Stevens, Davis, Miller & Mosher

[57] ABSTRACT

A selective call radio paging receiver having a display function for use in mobile communications and the like. Various apparatus functions are performed by two switches. A memory is responsive to closure of a first switch to receive and store message information succeeding an assigned paging code signal. A display is responsive to closure of a second switch to display message information stored in the memory. A controller controls the memory and the display and detects actuation of the second switch for a time duration exceeding a predetermined time period to enable erasure of the message information stored in the memory.

8 Claims, 7 Drawing Sheets

SELECTIVE CALL RADIO PAGING RECEIVER HAVING DISPLAY FUNCTION AND REDUCED CONTROL INPUTS

This application is a continuation of application Ser. No. 07/596,368, filed Oct. 12, 1990 (abandoned).

BACKGROUND OF THE INVENTION

1. Field of the Invention

The present invention relates to a selective call radio paging receiver having display function used in mobile communication, for example.

2. Description of the Prior Art

A conventional selective call radio paging receiver has a memory erase mode switch separate from an operation start switch and a memory read switch and is so configured that the memory erasing may be performed by using an execution switch which functions as the memory read switch.

Figure 5:
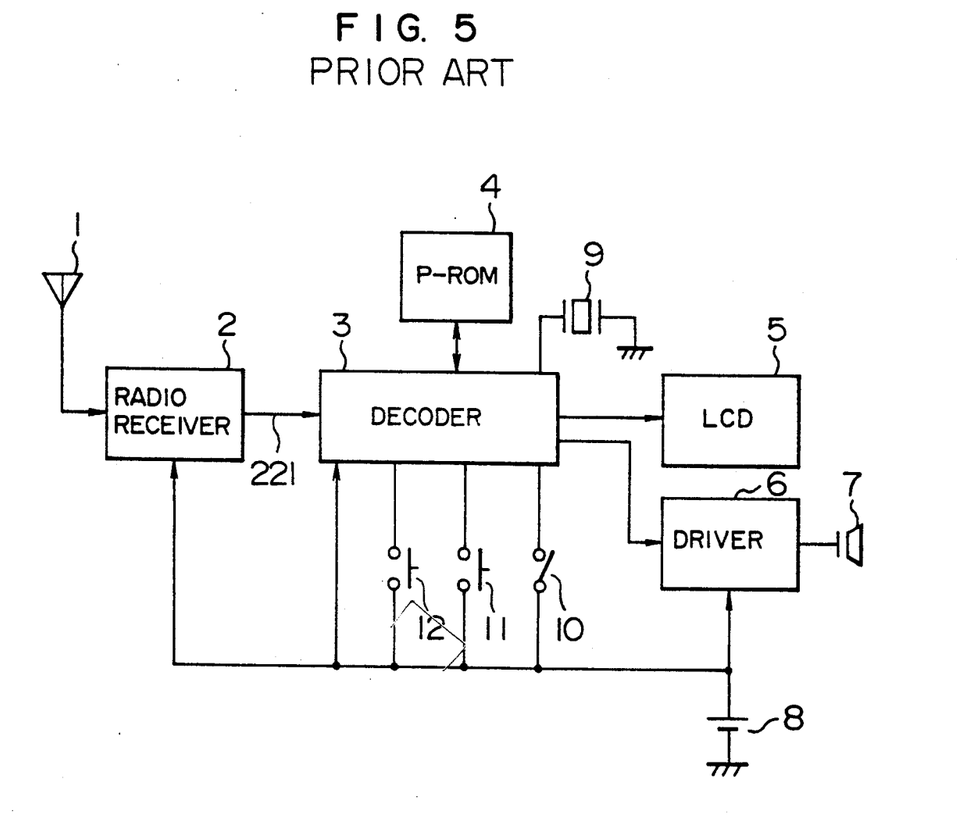
FIG. 5 is a schematic block diagram of a selective call radio paging receiver having display function of the prior art.

FIG. 5 shows configuration of a conventional selective call radio paging receiver of this type. In FIG. 5, numeral 1 denotes an antenna, 2 a radio receiver, a decoder, 4 an individual memory (P-ROM) for exclusive use, 5 a liquid crystal display device (LCD), 6 a driver, 7 a speaker, 8 power supply, 9 a quartz oscillator, 10, 11 and 12 switches.

The switches 10, 11 and 12 are connected to the decoder 3 and function to indicate control conditions. That is to say, the switch 10 performs start of initial operation accompanied by initial display. The switch 11 performs suspension of ringing, suspension of display and start of the liquid crystal display device 5, readout of message information, and erase execution. The switch 12 performs setting memory erase mode.

Figure 6:
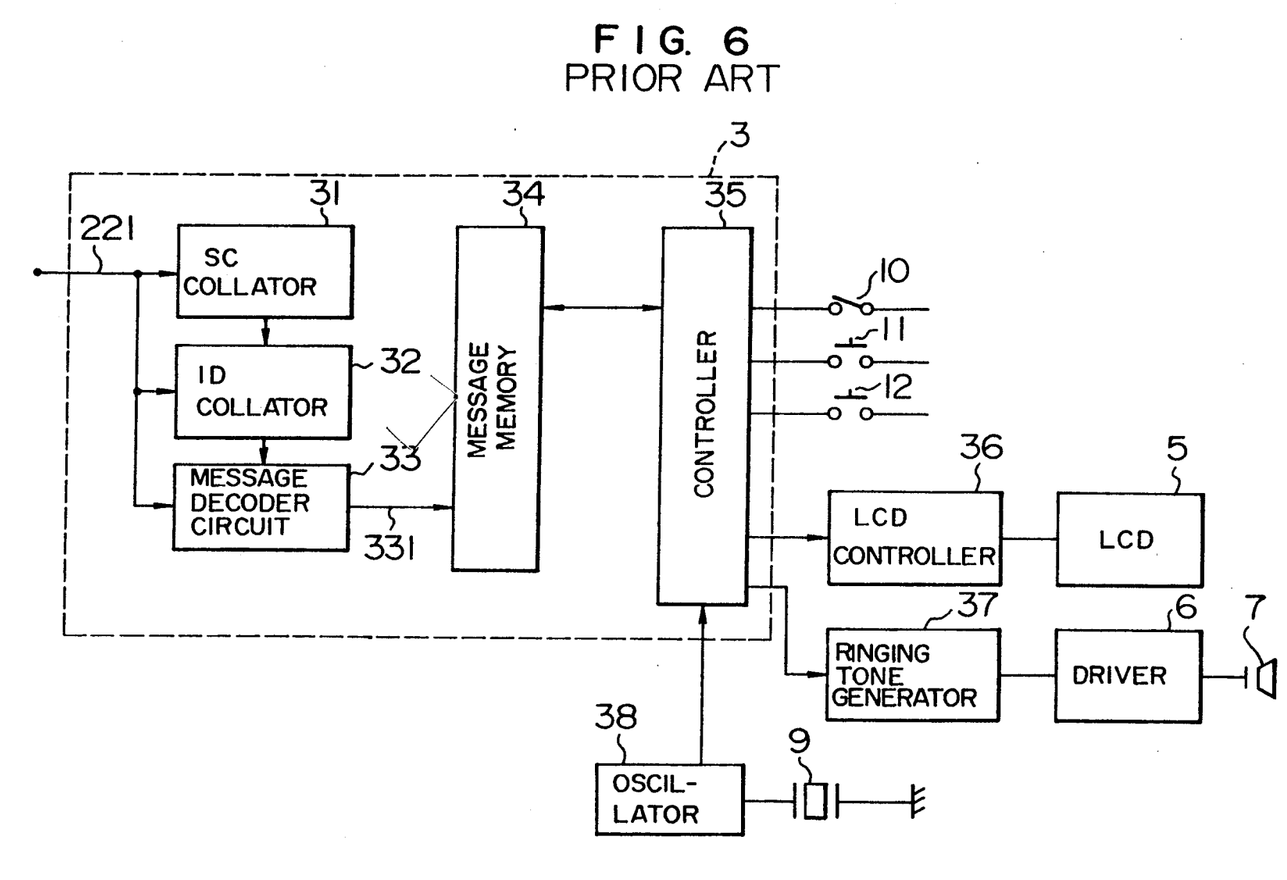
FIG. 6 is a schematic block diagram of a decoder included in the apparatus of FIG. 5.

As shown in FIG. 6, the decoder section 3 comprises an SC collator 31 for comparing a signal 221 received from the radio receiver 2 with a fixed frame synchronizing signal SC (Synchronization Codeword), an ID collator 32 for comparing succeeding contents of the received signal 221 with a selective calling number in its own frame, a message decoder circuit 33 for extracting message data 331 out of further succeeding contents of the received signal 221, a message memory 34 for storing a decoded message, and a controller 35 for controlling them.

The controller 35 supplies the stored message information to an LCD controller 36 and supplies ringing start information and ringing suspension information to ringing tone generator 37. At this time, the switches 10, 11 and 12 input the above described control conditions to the controller 35. The controller 35 exercises control so as to make the message memory 34, the LCD controller 36 and the ringing tone generator 37 perform predetermined operation. Further, a clock generated by a quartz oscillator 9 and an oscillator 38 is supplied to the control section 35 as the clock for taking in data, processing and control operation.

Figure 7:
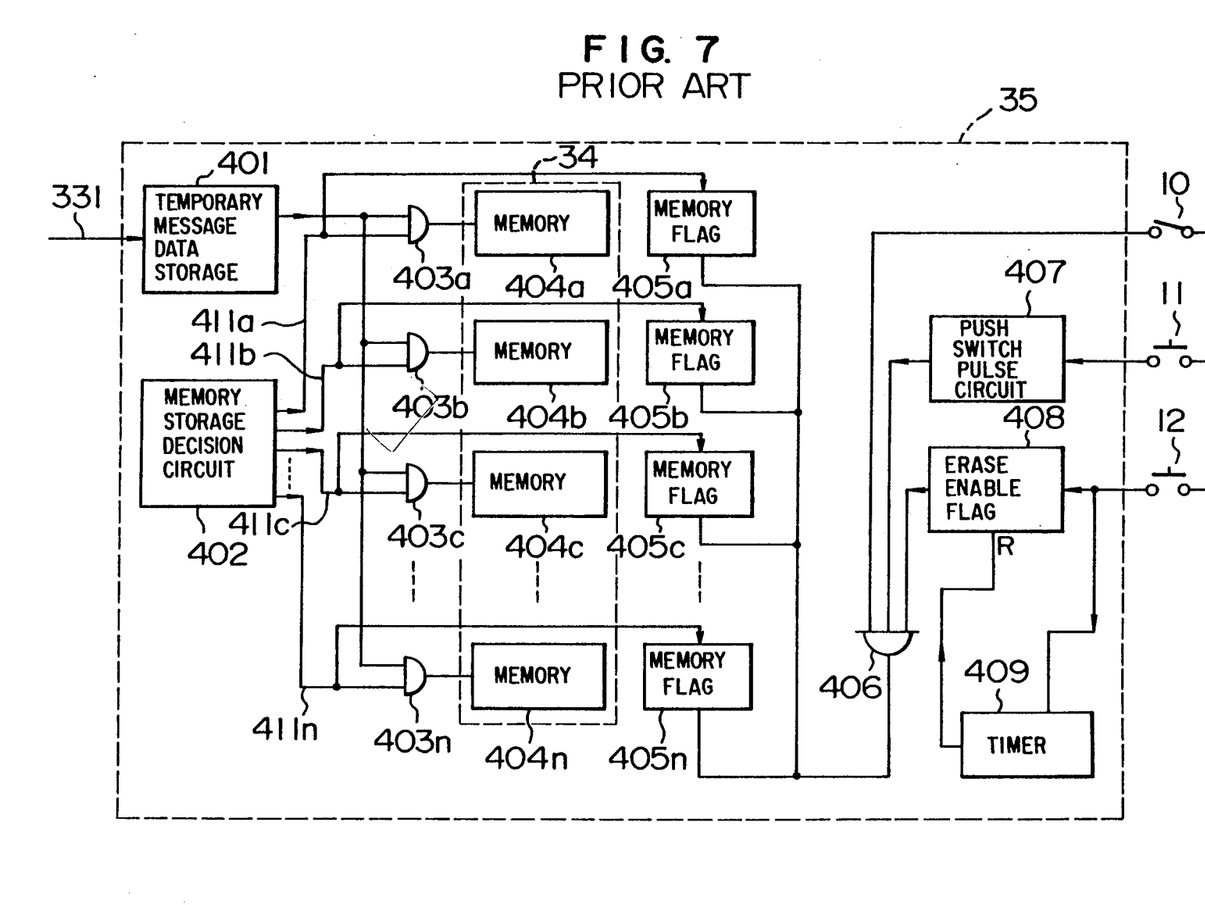
FIG. 7 is a schematic block diagram of a message memory controller included in the apparatus.

FIG. 7 logically shows the message memory control operation conducted in the decoder 3. The message data signal 331 is temporarily saved into a temporary message data storage 401 and then stored into one of memories 404a to 404n by a memory storage decision circuit 402. Setting of memory flags 405a to 405n is also performed. The memory flags 405a to 405n are used to judge whether message data of the memories 404a to 404n corresponding thereto are valid or invalid. The memories 404a to 404n comprise shift registers, for example. The memory flags 405a to 405n comprise R-S flip-flops.

In response to respective memory enable condition signals 411a to 411n supplied from the memory storage decision circuit 402, AND gates 403a to 403n exercise control to transfer the message data stored in the temporary message data storage 401 to the memories 404a to 404n. In case the message data stored in the temporary message data storage 401 is to be transferred to the memory 404a, for example, the memory enable condition signal 411a is set at "1" and the signals 411b to 411n are set at "0". Thus only the AND gate 403a is enabled, and transfer is performed without destructing contents of other memories 404b to 404n. By repeating such operation, setting can be performed with respect to some of the memories 404a to 404n and the memory flags 405a to 405n.

The procedure for erasing message data will now be described. After operation has been started by the switch 10, an erase enable flag 408 is set by the switch 12, and a timer 409 is started concurrently therewith. The timer 409 is a Johnson counter, for example. The output of the timer 409 obtained after a predetermined time resets the erase enable flag 408. If a push switch pulse circuit 407 activated by the switch 11 outputs a pulse "1" when the erase enable flag 408 is valid, i.e., the output of the erase enable flag is "1", an AND gate 406 outputs reset signals to the memory flags 405a to 405n.

In the above described conventional selective call radio paging receiver apparatus as well, it is thus possible to erase message data stored in the memories 405a to 404n by setting a memory erase mode by means of the switch 12 and executing memory erase by means of the switch 11.

In recent years, integrated circuit techniques and high density packaging techniques have significantly advanced. In the selective call radio paging receiver apparatus of this kind as well, realization of an apparatus diversified in function, reduced in size and lowered in cost is demanded. Especially for mechanical parts such as switches, however, the effort that went into reduction of size and cost approaches its limit. A low-cost apparatus capable of having diversified functions without increasing the number of such switches and capable of providing manipulation easiness maintained favorably is desired.

In regard to such a desire, the above described conventional apparatus has a problem that packaging of parts for size reduction is difficult and cost increase is incurred because three switches 10, 11 and 12 for assignment of multiple functions are used.

Further, it is sufficient that the selective call radio paging receiver undergoes operation start manipulation once a day and stores received messages corresponding to a day. For call signal receiving exceeding the message information storage capacity, information may be successively erased beginning with the oldest message information. In case such message information erasing is performed by means of switch manipulation, it is desired that message information is not simply erased even if a switch is turned off by false manipulation of the switch. Further, it is desired that memory erasing can be performed by means of predetermined manipulation in case all of the message information has been confirmed or all of the message information is desired to be erased on the following day.

In many of conventional apparatuses as described above, however, a switch of integral type having three slide positions and a push button is typically used as the function assigning switch. When switching from N (normal position) among three slide positions to M (Non-Alert receiving position) is performed, therefore, false switching to OFF (receiving stop position) is often caused. Message information stored in the memory is thus often erased unintentionally, resulting in a problem.

The present invention aims at solving the above described problems of the prior art. An object of the present invention is to provide a low-cost selective call radio paging receiver having display function which allows assignment of multiple functions without increasing the number of switches and which does not hamper the ease of manipulation.

SUMMARY OF THE INVENTION

In order to achieve the above described object, the present invention makes it possible to assign functions such as operation start, ringing stop, LCD display, message information reading and message information erasing with two switches, i.e., first and second switches, by controlling the switch manipulation sequence and the timer.

Therefore, the present invention brings about an effect that message information can be erased in accordance with the simple manipulation precedure using conventional switches by releasing the off-state of the first switch for operation start and continuously depressing the second switch for a predetermined time within the receiving operation interval.

DESCRIPTION OF THE PREFERRED EMBODIMENTS

The present invention will hereafter be described by referring to accompanying drawings. However, these drawings are the same as FIGS. 5 to 7 of the prior art with the exception of a switch circuit. In the following description other similar elements are denoted by like characters.

Figure 1:
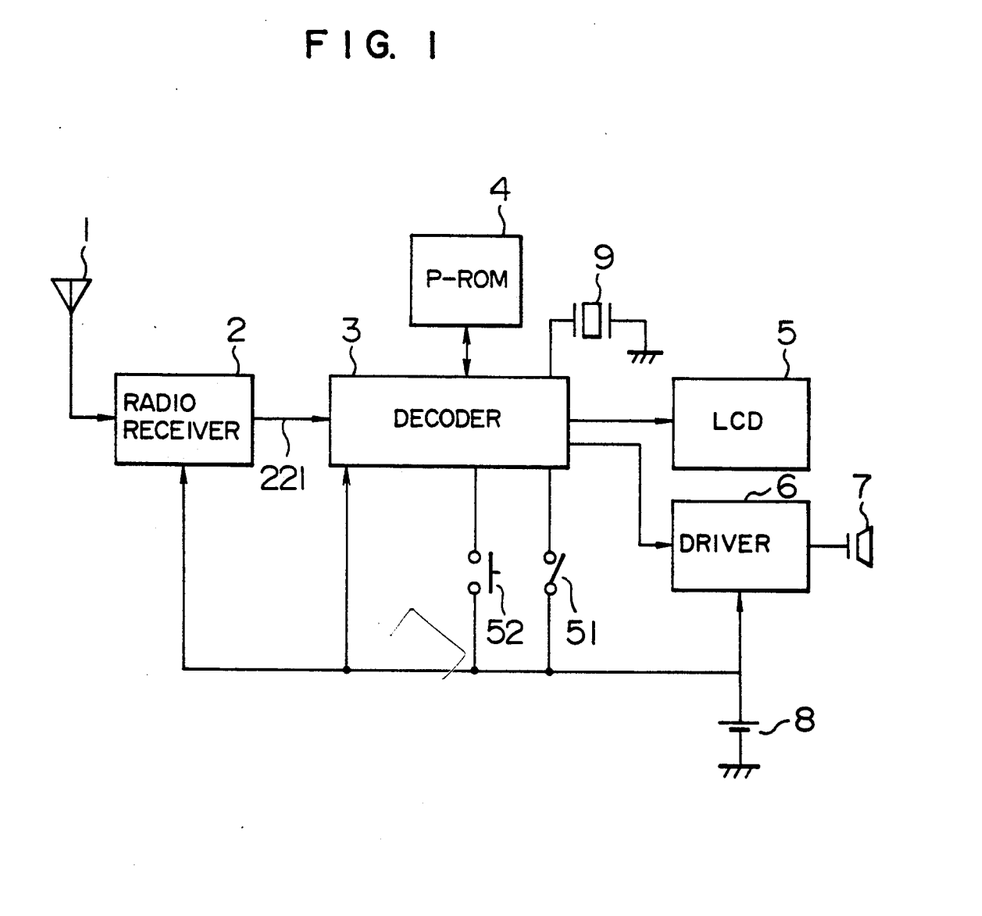
FIG. 1 is a schematic block diagram showing the general configuration of a selective call radio paging receiver having display function according to an embodiment of the present invention.

FIG. 1 shows the configuration of an embodiment of the present invention. In FIG. 1, numeral 1 denotes an antenna. In a radio receiver 2, a received radio signal is amplified, demodulated, shaped in waveform, and converted into a digital received signal 221 having a NRZ (Non Return to Zero) waveform which can be read by a decoder 3. The decoder 3 compares selective calling number information stored in an individual memory 4 (PROM) for exclusive use with paging code signal information included in the received signal 221 which is supplied from the radio receiver 2. Upon coincidence, the decoder 3 performs a reception alerting operation such as calling operation. In the calling operation, a ringing signal is supplied to a driver 6 to drive a speaker 7. Further, the decoder 3 decodes a message signal following the paging code signal information included in the digital received signal 221 and drives a liquid crystal device (LCD) 5 to display message information.

A first switch 51 and a second switch 52 are connected to the decoder 3. The first switch 51 starts initial operation accompanied by initial display. The second switch 52 performs suspension of ringing, suspension and start of display of the liquid crystal display device 5, readout of message information, and execution of erasing operation. A quartz oscillator 9 is an oscillator for generating a clock which activates the decoder 3.

Figure 2:
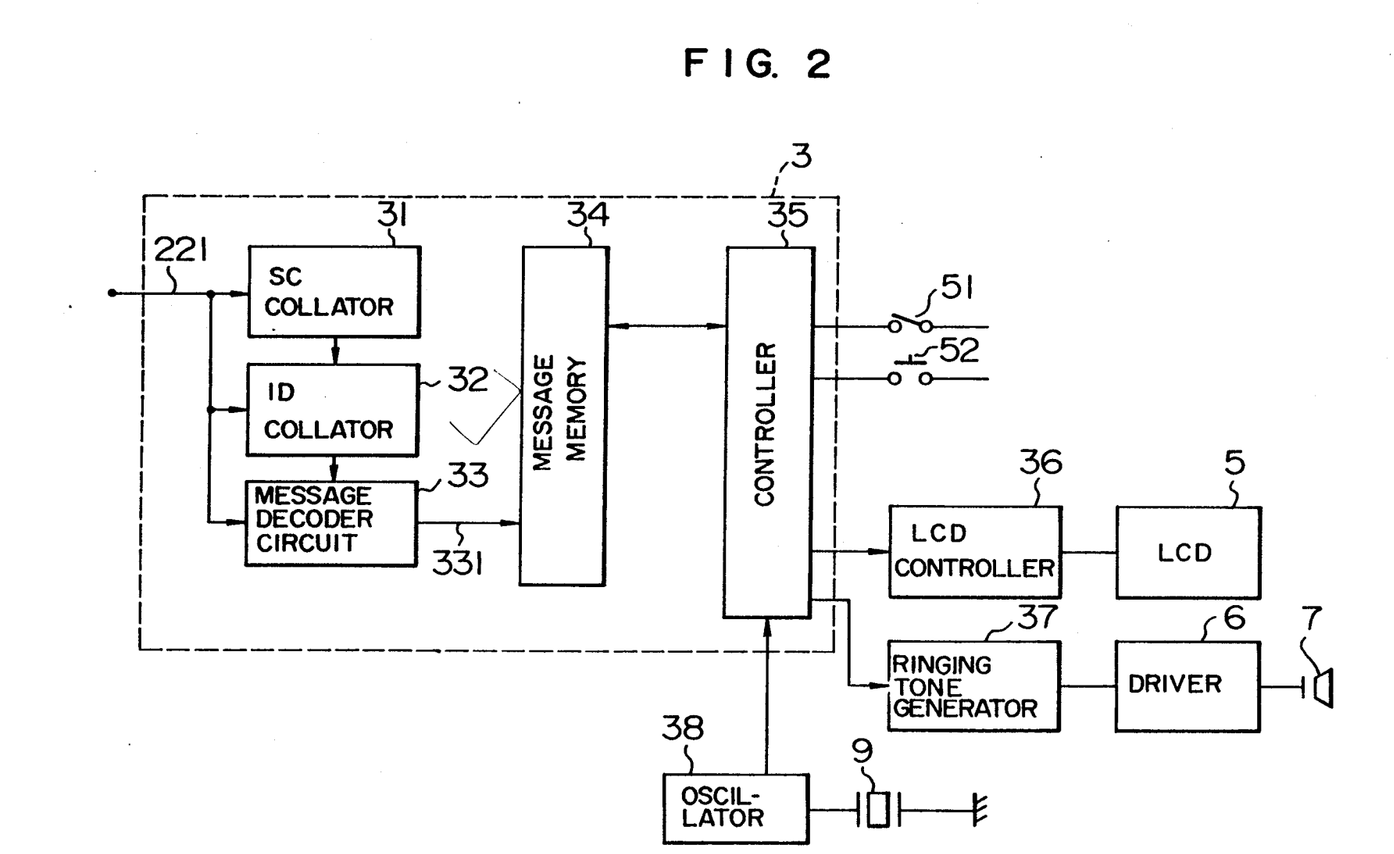
FIG. 2 is a schematic block diagram of a decoder included in the apparatus of FIG. 1.

The configuration and operation of the decoder 3 will now be described by referring to FIG. 2. In case of CCIR Radiopaging Code No. 1 described in study report A of POCSAG (the British Post Office Code Standardization Advisory Group) 1978/1979, for example, the decoder 3 compares received signal 221 supplied from the radio receiver 2 with a fixed frame synchronization signal (SC: Synchronizing Codeword) in an SC collator 31. Upon coincidence, succeeding contents of the received signal 221 are compared in an ID collator 32 with the paging code signal in its own frame. In case it is determined in the ID collator 32 that a selective calling number has been received, message data 331 is extracted in a message decoder circuit 33 out of further succeeding contents of the received signal 221 and stored into a message memory 34 by a controller 35.

In response to on-operation of the first switch 51, the controller 35 starts the receiving operation and stores the received message information into the memory 34. Further, the controller 35 supplies message information stored in the memory 34 to an LCD controller 36 to conduct initial operation display via the LCD 5. The controller 35 also supplies ringing start information and ringing stop information to a ringing tone generator 37 to make the speaker 7 announce initial operation. Further, in response to on-operation of the second switch 52, the controller 35 controls the LCD controller 36 to make the LCD 5 display message information. Further, after the controller 35 has detected continuation of the on-operation of the second switch 52 for a predetermined time, the controller 35 exercises control to erase the message information stored in the memory 34. A clock generated by the quartz oscillator 9 and an oscillator 38 is supplied to the controller 35 as the clock for taking in data, processing and control operation.

Figure 3:
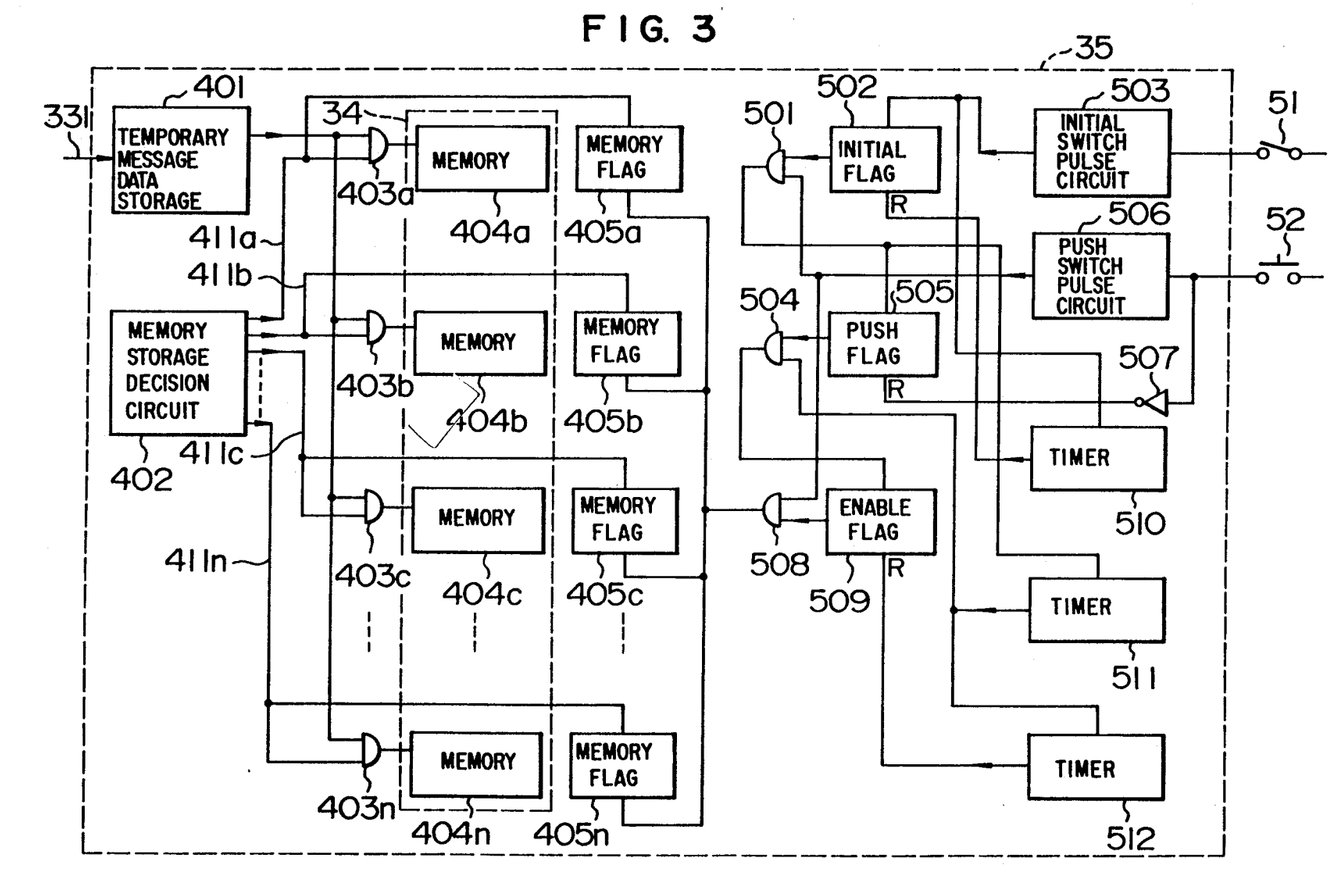
FIG. 3 is a schematic block diagram of a message memory controller included in the apparatus.

FIG. 3 is a schematic block diagram of the message memory controller 35 with memories 34 included in the decoder 3. The message data signal is temporarily saved into a temporary message data storage 401 and stored into one of memories selected from 404a to 404n by a memory storage decision circuit 402. Setting of memory flags 405a to 405n used for judging whether the stored message data are valid or invalid is also performed. The memories 404a to 404n comprise shift registers, for example. The memory flags 405a to 405n comprise R-S flip-flops.

In response to respective memory enable condition signals 411a to 411n supplied from the memory storage decision circuit 402, AND gates 403a to 403n exercise control to transfer the message data stored in the temporary message data storage 401 to the memories 404a to 404n. In case the message data stored in the temporary message data storage 401 is to be transferred to the memory 404a, for example, the memory enable condition signal 411a is set at "1" and the signals 411b to 411n are set at "0". Thus only the AND gate 403a is enabled, and transfer is performed without destroying contents of other memories 404b to 404n. By repeating such operation, setting can be performed with respect to some of the memories 404a to 404n and the memory flags 405a to 405n.

The memory flags 405a to 405n are controlled by an AND gate 508. The AND gate 508 is activated by the output of an enable flag 509 and the output of a push switch pulse circuit 506. The enable flag 509 is set by an AND gate 504, which is activated by the output of a timer 511 and the output of a push flag 505. The enable flag 509 is reset by the output of a timer 512 which is activated by the output of the timer 511. The push flag 505 is set by an AND gate 501 which is activated by the output of the push switch pulse circuit 506 and the output of an initial flag 502. The timer 511 is also started by the output of the AND gate 501. The initial flag 502 is set concurrently with the start of a timer 510 by the output of an initial switch pulse circuit 503.

Figure 4:
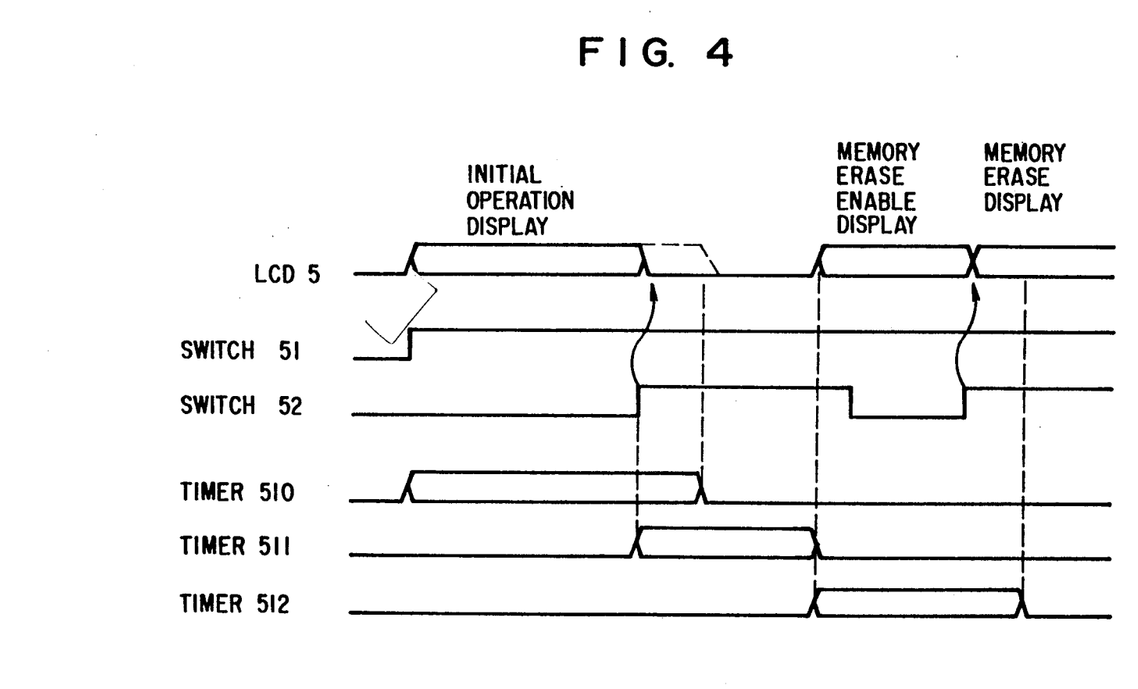
FIG. 4 is a time chart of the controller.

The procedure for erasing message data will now be described by referring to FIG. 4. A one-pulse signal outputted from the initial switch pulse circuit 503 by the first switch 51 sets the initial flag 502 and starts the timer 510. When the initial flag 502 is set, the controller 35 sets initial display data into the LCD controller 36, and the initial operation display is conducted in the LCD 5 by means of lighting of the whole, for example. This initial operation display is canceled by the output of the timer 510 or the output of the push switch pulse circuit 506 produced as a result of depression of the second switch 52.

If the output of the push switch pulse circuit 506 is generated by the second switch 52 while the initial flag 502 is not reset by the output of the timer 510, the AND gate 501 outputs a signal to set the push flag 505 and start the timer 511. The cancel condition of the push flag 505 corresponds to the off-condition of the second switch 52. Continuation of the set-state of the push flag 505 is caused by the continuation of depression of the second switch 52.

If a predetermined time has elapsed in the timer 511 while the second switch 52 is continuously depressed, the output signal of the timer 511 starts the timer 512 and the output signal of the AND gate 504 sets the enable flag 509. If the enable flag 509 is set, the timer 512 is operating even if the second switch 52 is turned off and hence that state is maintained. In addition, the controller 35 makes the LCD 5 perform the memory erase enable display via the LCD controller 36.

The enable flag 509 is reset by the output of the timer 512 obtained when a predetermined time has elapsed. If the enable flag 509 is set and the push switch pulse circuit 506 yields an output within the predetermined time of the timer 512, i.e., a signal output generated by depressing the second switch 52 again is inputted to the AND gate 508, the AND gate 508 resets the memory flags 405a to 405n. In the same way, the memory erase display on the LCD 5 is caused by the output of the AND gate 508.

In the above described embodiment, initial start operation is thus conducted by the first switch 51. In this operation, the timer detects continuous depression of the second switch 52 and monitors the depression time. Thereby, the erase mode of the message information can be set. This results in a merit that the similar function as conducted by a memory erase mode switch can be realized without using a memory erase mode switch for exclusive use.

As evident from the above described embodiment, the present invention brings about a merit that memory erasing can be performed in accordance with the manipulation procedure of already existing switches even if a memory erase mode switch for exclusive use is not used. In addition, since the number of switches is decreased by one as compared with the prior art, packaging of parts is facilitated and the size of the apparatus can be reduced. The effect of cost reduction is also obtained.

I claim:

1. A selective call paging receiver, comprising:
   (a) a first switch for generating a first signal when actuated;
   (b) a second switch for generating a second signal when actuated;
   (c) a memory means for receiving and accumulating therein message information representing plural messages each succeeding a paging code signal assigned to said receiver, said memory means being enabled to store said message information in response to said first signal; and
   (d) a control means or controlling said memory means, said control means comprising:
      (i) first circuit means for outputting a first-level signal in response to said first signal;
      (ii) a first timer for counting up a first predetermined time period in response to said first signal and for causing said first circuit means to cease outputting said first-level signal and to output a second-level signal when said first predetermined time period is counted up;
      (iii) a first AND gate receiving an output from said first circuit means and said second signal;
      (iv) second circuit means for outputting a said first-level signal in response to a high output from said first AND gate except when said second switch is in a non-actuated state;
      (v) a second timer for counting up a second predetermined time period in response to a high output from said first AND gate;
      (vi) a second AND gate receiving an output from second circuit means and an output from said second timer when said second predetermined time period is counted up;
      (vii) a third timer for counting up a third predetermined time period in response to said output from said second timer;
      (viii) a third circuit means for outputting a said first-level signal in response to a high output from said second AND gate until said third timer provides an output when said third predetermined time period is counted up;
      (ix) a third AND gate receiving said second signal and an output from said third circuit means and, when an output of said third AND gate is high, providing a control signal to said memory means to erase said message information accumulated in said memory means.

2. A receiver as defined in claim 1, further comprising display means, responsive to said second signal, for displaying said message information accumulated in said memory means.

3. A receiver as defined in claim 2, wherein said display means (i) in response to said first signal provides an initial operation display which ceases if said second signal is generated within said first predetermined time period, (ii) thereafter provides a memory erase enable display when said second signal is continuously generated at least for a duration of said second predetermined time period and (iii) thereafter provides a memory erase display in response to cessation of said second signal and subsequent re-generation of said second signal both occurring during said third predetermined time period.

4. A receiver as defined in claim 1, wherein said memory means comprises a plurality of memory units and said receiver further comprises a memory storing decision circuit, responsive to said first signal, for selecting one of said memory units to store incoming message information.

5. A receiver as defined in claim 4, further comprising a temporary message data storage for storing said incoming message information prior to its being stored in one of said memory units.

6. A receiver as defined in claim 5, further comprising a plurality of fourth AND gates and a plurality of fourth circuit means respectively associated with each of said memory units, said fourth AND gates receiving (a) in common an output of said temporary message data storage and (b) a different one of plural outputs from said memory storage decision circuit and providing an output to its associated one of said memory units, said fourth circuit means being caused to output a said first-level signal in response to said one of said plural outputs that is also received by its associated one of said fourth AND gates, said memory storage decision circuit controlling levels of said plural outputs to selectively enable said memory units to store said incoming message information.

7. A receiver as defined in claim 6, wherein each of said plurality of fourth circuit means receives said output of said third AND gate and, in response thereto, provides an output which has said second level.

8. A receiver as defined in claim 6, wherein said first, second, third and fourth circuit means are respectively an initial flag, a push flag, an enable flag and memory flags.

* * * * *